United States Patent
Miyamoto et al.

[11] Patent Number: 5,486,607
[45] Date of Patent: Jan. 23, 1996

[54] DIOXAZINE BLUE DYE COMPOUND HAVING VINYLSULFONE TYPE FIBER REACTIVE GROUPS

[75] Inventors: Tetsuya Miyamoto, Takatsuki; Miyao Takahashi, Minoo; Takahiko Fujisaki, Takarazuka; Naoki Harada, Suita; Yutaka Kayane, Ibaraki; Takashi Omura, Kobe, all of Japan

[73] Assignee: Sumitomo Chemical Company, Limited, Osaka, Japan

[21] Appl. No.: 379,028

[22] Filed: Jan. 27, 1995

Related U.S. Application Data

[63] Continuation of Ser. No. 40,587, Mar. 31, 1993, abandoned, which is a continuation of Ser. No. 860,193, Mar. 26, 1992, abandoned, which is a continuation of Ser. No. 489,863, Mar. 5, 1990, abandoned, which is a continuation of Ser. No. 292,256, Dec. 30, 1988, abandoned.

[30] Foreign Application Priority Data

Jan. 20, 1988 [JP] Japan .................... 63-11689

[51] Int. Cl.⁶ .................................. C07D 498/04
[52] U.S. Cl. .................................. 544/76; 544/77
[58] Field of Search .......................... 844/26, 77

[56] References Cited

U.S. PATENT DOCUMENTS

| | | | |
|---|---|---|---|
| 3,223,470 | 12/1965 | Boedeker et al. | 8/39 |
| 4,933,446 | 6/1990 | Sawamoto et al. | 544/76 |
| 4,977,261 | 12/1990 | Kayane et al. | 544/76 |
| 5,126,450 | 6/1992 | Smith | 544/76 |

FOREIGN PATENT DOCUMENTS

| | | | |
|---|---|---|---|
| 0074928 | 3/1983 | European Pat. Off. | |
| 0076782 | 4/1983 | European Pat. Off. | |
| 0158857 | 10/1985 | European Pat. Off. | |
| 0234778 | 9/1987 | European Pat. Off. | |
| 0275022 | 7/1988 | European Pat. Off. | |
| 309406 | 3/1989 | European Pat. Off. | 544/76 |
| 48-42275 | 12/1973 | Japan . | |
| 0014654 | 1/1982 | Japan | 544/76 |
| 58-71957 | 4/1983 | Japan . | |
| 2048768 | 3/1987 | Japan | 944/76 |

OTHER PUBLICATIONS

Beech, et al. Fiber Reactive Dyes, (Logos Press, London, 1970) pp. 65–69.

Shin Senshokukako Koza, (Tokyo, Japan, 1990,) p. 254.

Primary Examiner—Philip I. Datlow
Attorney, Agent, or Firm—Stevens, Davis, Miller & Mosher

[57] ABSTRACT

A dioxazine compound represented by the following formula in the free acid form,

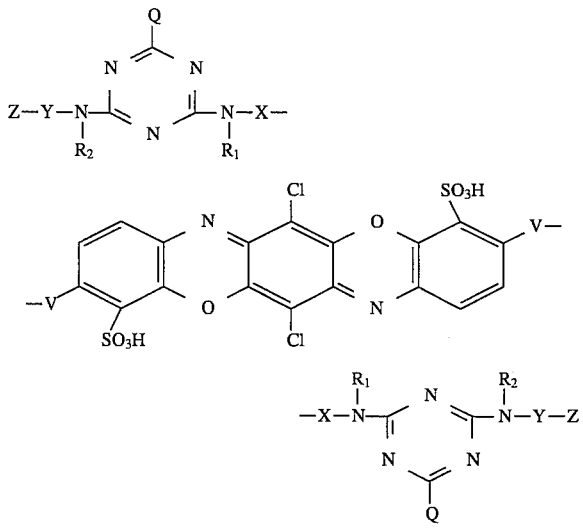

wherein V'is a direct linkage or $$-\underset{\underset{R_3}{|}}{N}-$$

in which $R_3$ is hydrogen or alkyl, X is a direct linkage or an aliphatic, araliphatic or aromatic bridging group, Y is phenylene or naphthylene, Z is a so-called vinylsulfone type fiber reactive group, and $R_1$ and $R_2$ are each hydrogen or alkyl, which is useful for dyeing or printing fiber materials to give a dyed or printed product of a blue color superior in fastness properties with superior build-up property.

11 Claims, No Drawings

DIOXAZINE BLUE DYE COMPOUND HAVING VINYLSULFONE TYPE FIBER REACTIVE GROUPS

This application is a continuation of application Ser. No. 08/040,587, filed Mar. 31, 1993, (now abandoned) which in turn is a continuation of application Ser. No. 07/860,193, filed Mar. 26, 1992 (now abandoned), which in turn is a Continuation of application Ser. No. 07/489,863, filed Mar. 5, 1990 (now abandoned), which in turn is a Continuation of application Ser. No. 07/292,256, filed Dec. 30, 1988 (now abandoned).

The present invention relates to a dioxazine blue dye compound having vinylsulfone type fiber reactive groups, a process for producing the same and a process for dyeing or printing hydroxyl or amide group-containing materials, particularly those such as cellulose fibers, natural or synthetic polyamide fibers, polyurethane fibers, leathers and mixed fibers thereof, by using the same to give dyed or printed products superior in fastness properties such as light fastness, wet fastness and chlorine fastness.

Reactive dyes, particularly those having the vinylsulfone type fiber reactive group have been extensively used for dyeing or printing hydroxyl or amide group-containing fiber materials, particularly those such as cellulose fibers, because of their characteristic features such that they can be applied to various kinds of dyeing or printing methods and can give dyed or printed products of a brilliant color shade.

Dioxazine reactive dyes of this kind are known as disclosed in, for example, U.S. Pat. No. 3,223,470, U.K. Patent No. 1,368,158, and Published Examined Japanese Patent Application No. 60-18,359.

However, these known dyes are not yet sufficient in dye performances such as level-dyeing property, build-up property, dyeing velocity and fastness properties of dyed or printed products, and awaiting for improvements.

The present inventors have undertaken extensive studies to find a dioxazine compound meeting needs of high level for the dye performances, and as a result have attained to the present invention.

The present invention provides a dioxazine compound represented by the following formula (I) in the free acid form,

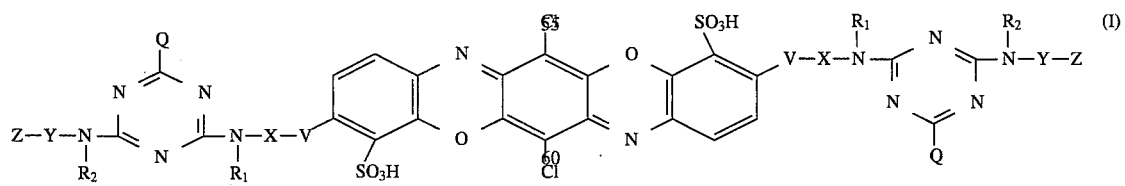

wherein V is a direct linkage or

in which $R_3$ is hydrogen or unsubstituted or substituted alkyl, X is a direct linkage or an aliphatic, araliphatic or aromatic bridging group, Y is unsubstituted or substituted phenylene or naphthylene, Z is $-SO_2CH=CH_2$ or $-SO_2CH_2CH_2Z_1$ in which $Z_1$ is a group splittable by the action of an alkali, Q is alkoxy or unsubstituted or substituted amino, and $R_1$ and $R_2$ independently of one another are each hydrogen or unsubstituted or substituted alkyl, and a process for producing the dioxazine compound of the above formula (I), which comprises subjecting any one of an intermediate dioxazine compound represented by the following formula (V) in the free acid form,

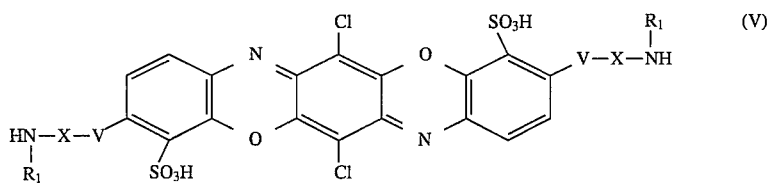

wherein $R_1$, V and X are as defined above, an amine compound represented by the following formula (VI),

wherein $R_2$, Y and Z are as defined above, or a compound represented by the following formula (VII),

wherein Q is as defined above, to first condensation with 2,4,6-trihalogeno-s-triazine, followed by second and third condensations using the remaining ones.

The present invention also provides a process for dyeing or printing hydroxyl or amide group-containing materials, which comprises using the dioxazine compound of the above formula (I).

With respect to the symbol X in the above formula (I), the aliphatic bridging group may be straight, branched or cyclic, and may be unsubstituted or substituted by sulfo, carboxy, methyl, methoxy or optionally substituted phenyl. Moreover, said aliphatic group may contain a hetero atom in the chain. Examples thereof are as follows;

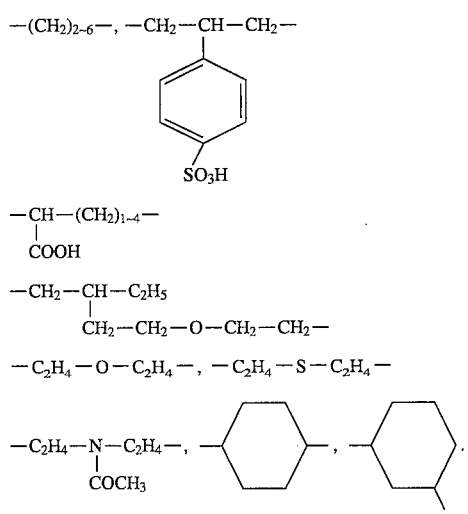

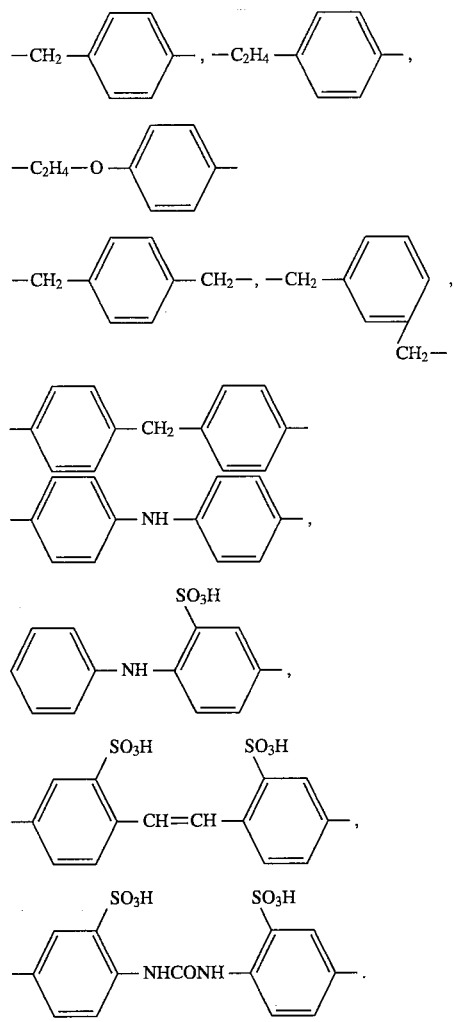

The araliphatic bridging group may be unsubstituted or substituted by sulfo, carboxy, methyl, methoxy or optionally substituted phenyl, and may contain a hetero atom in the aliphatic chain. Examples thereof are as follows;

The aromatic bridging group may be unsubstituted or substituted by sulfo, carboxy, methyl, methoxy or optionally substituted phenyl. Examples thereof are as follows;

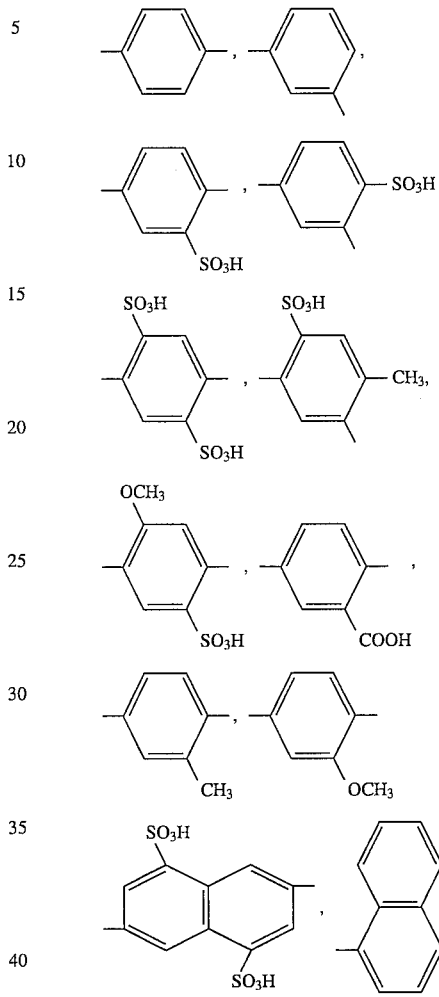

Of these, particularly preferred X includes direct linkage, alkylenes having 2 to 6 carbon atoms, particularly those such as ethylene and propylene, and phenylene unsubstituted or substituted once or twice by sulfo.

With respect to the symbol Q, the amino unsubstituted or substituted includes amino, alkylamino, N,N-dialkylamino, cycloalkylamino, aralkylamino, arylamino and N,N-disubstituted amino such as N,N-dialkylamino, N-alkyl-N-cycloalkyl and N-alkyl-N-arylamino, as well as heterocyclic ring-containing amino which heterocyclic ring may be further addition-condensed with a homocyclic ring, and N-heterocyclic ring-constituting amino which may contain additional hetero atoms (in the present invention, the term "N-heterocyclic ring-constituting amino" is intended to mean such that the nitrogen atom of the amino is a member forming a heterocyclic ring).

In the above definition with respect to the amino, the alkyl is a straight or branched one preferably having 1 to 4 carbon atoms, and preferable examples of the cycloalkyl, aralkyl and aryl are cyclohexyl, benzyl, phenethyl, phenyl and naphthyl, respectively. Examples of the heterocyclic ring are furan, thiophene, pyrazole, pyridine, pirimidine, quinoline, benzimidazol, benzthiazol and benzoxazol. The N-heterocyclic ring-constituting amino is preferably a six-membered ring which may contain additional hetero atoms such as nitrogen, oxygen and sulphur. The above-mentioned alkyl, cycloalkyl, aralkyl, aryl, heterocyclic ring and N-heterocyclic ring may be unsubstituted or substituted with halogen, nitro, cyano, trifluoromethyl, sulfamoyl, carbamoyl, $C_1$–$C_4$ alkyl, $C_1$–$C_4$ alkoxy, acylamino, ureido, hydroxyl, carboxyl, sulfomethyl and sulfo.

Preferable examples of the amino represented by Q are —$NH_2$, methylamino, hydroxymethylamino, ethylamino, propylamino, butylamino, hexylamino, β-methoxyethylamino, β-ethoxyethylamino, γ-methoxypropylamino, N,N-dimethylamino, N,N-di-hydroxymethylamino, N,N-diethylamino, β-chloroethylamino, β-cyanoethylamino, N,N-di-β-hydroxyethylamino, β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3- and 4-sulfoanilino, 2,4- and 2,5 -disulfoanilino, sulfomethylanilino, N-sulfomethylanilino, 3- and 4-carboxyphenylamino, 2-carboxy-5 -sulfophenylamino, 2-carboxyl-4-sulfophenylamino, 2 -methoxy-5-sulfophenylamino, 2-methyl-5-sulfophenylamino, 4-sulfonaphthyl-(1)-amino, 3,6-disulfonaphthyl-( 1)-amino, 3,6,8-trisulfonaphthyl-(1)-amino, 4,6,8 -trisulfonaphthyl-(1)-amino, 6-sulfonaphthyl-(2)-amino, 4,8 -disulfonaphthyl-(2)-amino, 3,6,8-trisulfonaphthyl-( 2)-amino, 4,6,8-trisulfonaphthyl-(2)-amino, pyridyl-( 2)-amino, morpholino, piperidino, piperazino, N-β-hydroxyethyl-N-methylamino, N-ethyl-N-hydoxymethylamino, carboxymethylamino, β-carboxyethylamino, β-sulfoethylamino, N-(β-sulfoethyl)-N-methylamino and the like.

The alkoxy represented by Q includes those having 1 to 4 carbon atoms, such as methoxy, ethoxy and the like.

Of these represented by Q, particularly preferred are unsubstituted or substituted amino such as amino, carboxymethylamino, N,N-dihydroxymethylamino, ethylamino, β-carboxyethylamino, β-hydroxyethylamino, β-methoxyethylamino, β-sulfoethylamino, N-(β-sulfoethyl)-N-methylamino, N,N-diethylamino, N,N-di-β-hydroxyethylamino, phenylamino, N-ethyl-N-phenylamino, toluidino, anisidino, 2-, 3- or 4-sulfoanilino, 2,4- or 2,5 -disulfoanilino, 2-carboxy-5-sulfophenylamino, 3,6 -disulfonaphthyl-(1)-amino, 3,6,8-trisulfonaphthyl-( 1)-amino, 4,8-disulfonaphthyl-(2)-amino, 3,6,8 -trisulfonaphthyl-(2)-amino and morpholino.

Of these, particularly preferred are β-sulfoethylamino, phenylamino, N-ethyl-N-phenylamino, 2-, 3- or 4-sulfoanilino, and 2,4- or 2,5-disulfoanilino.

With respect to the symbol Y, the phenylene includes those unsubstituted or substituted once or twice by methyl, ethyl, methoxy, ethoxy, chloro, bromo or sulfo, and the naphthylene includes those unsubstituted or substituted once by sulfo. Preferred examples thereof are as follows:

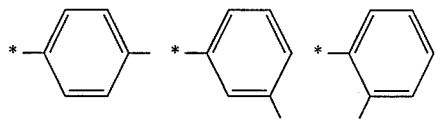

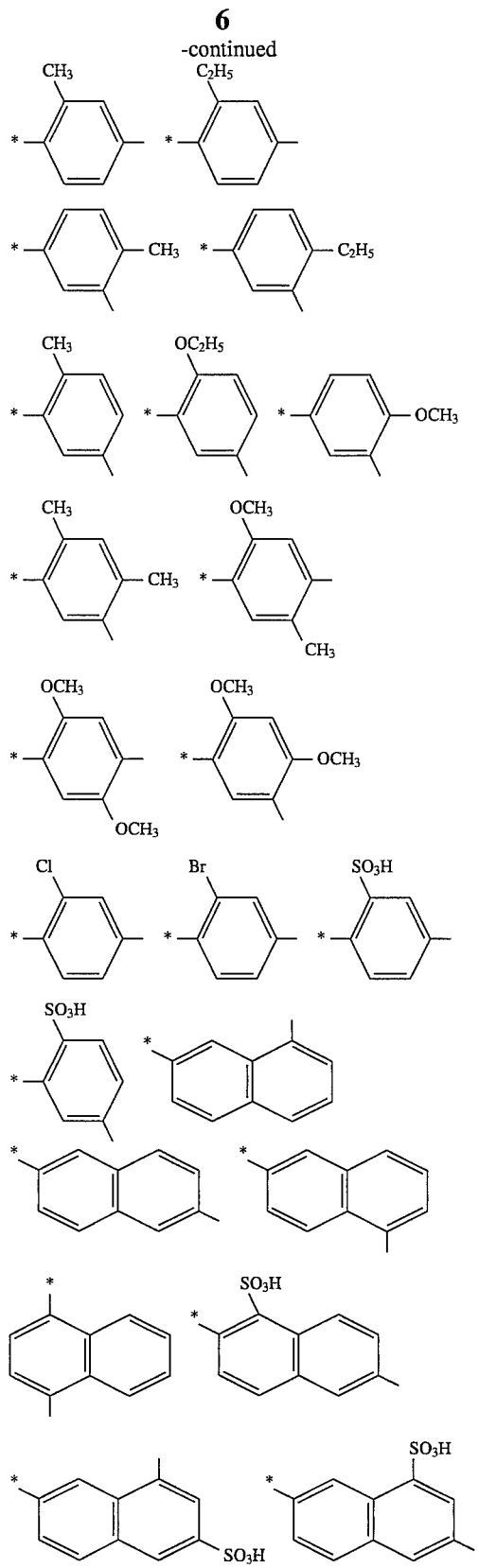

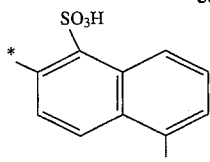

In the above formulas, the asterisked linkage bonds to the group —NR$_2$—.

With respect to the symbol Z$_1$, the group splittable by the action of an alkali includes those well known such as sulfato, thiosulfato, phosphato, acetoxy, halogeno and the like. Of these, particularly preferred is sulfato.

With respect to the symbols R$_1$ and R$_2$, the alkyl is preferably one having 1 to 4 carbon atoms, and is unsubstituted or substituted by hydroxy, cyano, alkoxy, halogeno, carbamoyl, carboxy, alkoxycarbonyl, alkylcarbonyloxy, sulfo or sulfamoyl.

Preferred examples of those represented by R$_1$ and R$_2$ are hydrogen, methyl, ethyl, n-propyl, isopropyl, n-butyl, isobutyl, sec-buty, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy- 3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonoyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like. Of these, particularly preferred are hydrogen, methyl and ethyl.

Among these dioxazine compounds in accordance with the present invention, particularly preferred is one represented by the following formula (II) in the free acid form,

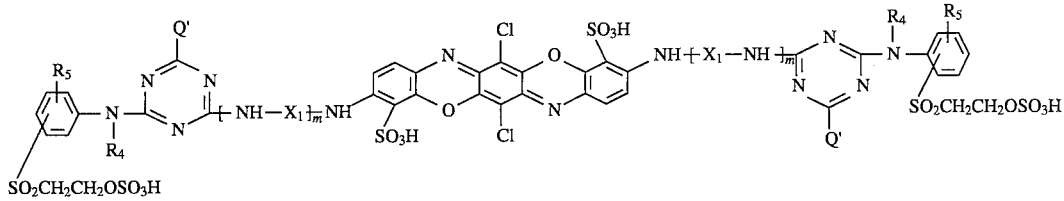

wherein Q' is unsubstituted or substituted amino, X$_1$ is ethylene, propylene or sulfophenylene, R$_4$ is hydrogen, methyl or ethyl, R$_5$ is hydrogen, methyl, methoxy or sulfo, and m is 0 or 1.

The dioxazine compound of the formula (I) may be in the form of a free acid or a salt of an alkali metal or alkaline earth metal. Of these metal salts, preferred are sodium, potassium and lithium salts.

The dioxazine compound of the formula (I) can be produced in the following manner.

The intermediate dioxazine compound of the formula (V), the amine compound of the formula (VI) and the compound of the formula (VII) can be subjected to condensation reactions in an optional order with a 1,3,5-trihalogeno-s-triazine, thereby obtaining the desired dioxazine compound of the formula (I).

Although any of the condensation reactions can be carried out under optional reaction conditions and the order of the condensation reactions is not limited, the first condensation can be preferably carried out at a temperature of −10° to 40° C. and at a pH ranging from 2 to 9, the second condensation at a temperature of 0° to 70° C. and at a pH ranging from 2 to 9, and the third condensation at a temperature of 10° to 100° C. and at a pH ranging from 2 to 7. The order of the condensation reactions can be determined preferably in such a manner that any compound having the lowest reactivity to the 1,3,5-trihalogeno-s-triazine is subjected to first condensation reaction.

The intermediate dioxazine compound of the formula (V) can be readily prepared in a conventional manner, for example, in the following manner.

An aniline compound represented by the following formula (III) in the free acid form,

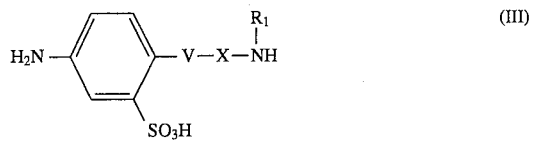

wherein R$_1$, V and X are as defined above, is subjected to condensation with chloranil, thereby obtaining a dianilide represented by the following formula (IV) in the free acid form,

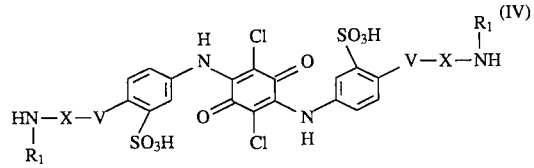

wherein R$_1$, V and X are as defined above. The anilide isolated from the reaction mixture is preferably dried and then subjected to ring closure, if desired, in the presence of an oxydizing agent, thereby obtaining the desired intermediate dioxazine compound of the formula (V).

The dioxazine compound (I) in accordance with the present invention is fiber-reactive and useful for dyeing or printing hydroxyl group-containing and amide group-containing materials. The materials are favorably in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium dihydrogen phosphate, disodium hydrogen phosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonic acid, or an addition product between stearylamine and ethylene oxide, and the like.

The present dioxazine compound (I) can be characterized by excellent dye performances in the dyeing and printing of fiber materials, particularly cellulose fiber materials. For example, the compound can give a dyed product excellent in light fastness, perspiration-light fastness, wet fastness such as washing resistance, peroxide-washing resistance, perspiration resistance and acid-hydrolysis resistance, and alkali fastness, chlorine fastness, abrasion fastness and iron fastness.

The dioxazine compound (I) can also exhibit excellent build-up, level-dyeing and wash-off properties and high solubility as well as high exhaustion and fixation percentages. Moreover, the dioxazine compound (I) can hardly be affected by changes in a dyeing temperature and dyeing bath ratio, so that a dyed product with a constant quality can be obtained with superior reproductibility.

Moreover, the dioxazine compound (I) can be characterized in properties such that the compound (I) is hard to change in its quality even when brought into contact with a basic substance during storage, and products dyed or printed with the compound (I) are hard to change in their color even when they are subjected to fix-treatment or resin-finishing.

The present invention is illustrated in more detail with reference to the following Examples, which are only illustrative, but not limitative. In Examples, parts and % are by weight.

Example 1

A solution of 1,4-diaminobenzene-2-sulfonic acid (94 parts) in water (700 parts) was added dropwise to a dispersion of chloranil (64.6 parts) in ethanol (4000 parts). The mixture was heated upto 60° C., and kept at this temperature to complete the reaction. The reaction mixture was cooled, and crystals isolated were added to 28% oleum (800 parts). The mixture was heated upto 45° C. and kept at that temperature to complete the reaction. The reaction mixture was poured into ice water. Salting out gave a dioxazine intermediate compound represented by the following formula in the free acid.

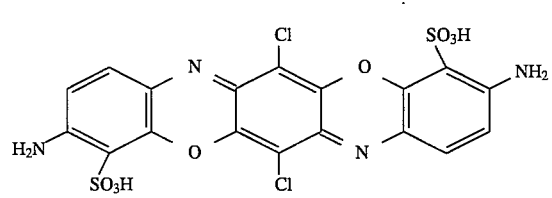

A mixture of the dioxazine intermediate compound (54.5 parts) and cyanuric chloride (37 parts) in water (500 parts) was subjected to condensation reaction, while sodium carbonate being added to neutralize the hydrochloric acid liberated. After completion of the reaction, 1-aminobenzene-3-β-sulfatoethylsulfone (56 parts) was added to the reaction mixture, and the resulting mixture was likewise subjected to condensation reaction. Thereafter, metanilic acid (35 parts) was added to the reaction mixture, and the mixture was heated upto 70° to 80° C., while sodium carbonate being added to neutralize the hydrochloric acid liberated, and stirred at that temperature to complete the reaction. After-treatments including salting out and filtration gave a dioxazine compound represented by the following formula in the free acid form.

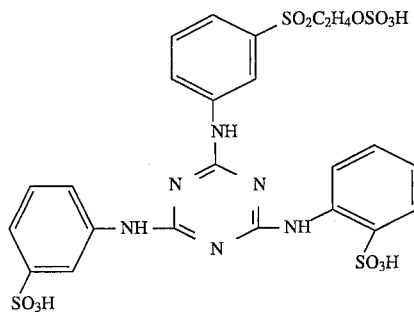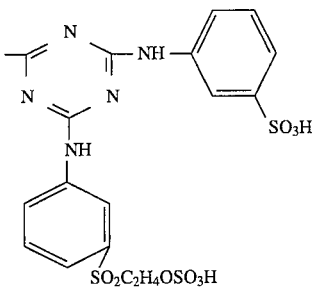

λmax 590 nm in a water medium

Example 2

The dioxazine compound (each of 0.1, 0.3 and 0.6 parts) was dissolved in water (200 parts) to prepare each dye bath. Sodium sulfate (10 parts) and cotton (10 parts) were added to the bath, and the bath was heated to 60° C. Sodium carbonate (4 parts) was added thereto, and dyeing was continued for 1 hour at that temperature. Thereafter cotton taken out was washed with water, soaped, again washed with water and then dried to obtain each dyed product of a reddish blue color superior in fastness properties. The build-up property was found to be superior.

Examples 3 to 22

Example 1 was repeated, provided that the 1,4-diaminobenzene-2-sulfonic acid was replaced by the compound represented by the formula (III) as shown in the following Table I to obtain the corresponding dioxazine intermediate compound as shown therein and the 1-aminobenzene-3-β-sulfatoethylsulfone was replaced by the amine represented by the formula (VI) also as shown in the following Table I, thereby obtaining the corresponding dioxazine compound.

TABLE I

| Example No. | Aniline compound (III) | Intermediate dioxazine compound (V) | Amine (VI) | Color on cotton |
|---|---|---|---|---|
| 3 | H₂N—⌬(NH₂)(SO₃H) | dioxazine structure with SO₃H, Cl, NH₂ groups | H₂N—⌬—SO₂C₂H₄OSO₃H | Reddish blue |
| 4 | ″ | ″ | H₂N—⌬(OCH₃)—SO₂C₂H₄OSO₃H | ″ |
| 5 | ″ | ″ | H₂N—naphthyl—SO₂C₂H₄SO₃H (HO₃SOC₂H₄SO₂) | ″ |
| 6 | ″ | ″ | H₂N—⌬(OCH₃)—SO₂C₂H₄OSO₃H | ″ |
| 7 | H₂N—⌬(NH₂)(SO₃H) | dioxazine structure with SO₃H, Cl, NH₂ groups | H₂N—⌬(SO₃H)—SO₂C₂H₄OSO₃H | Reddish blue |
| 8 | ″ | ″ | H₂N—naphthyl(SO₃H)—SO₂C₂H₄OSO₃H | ″ |
| 9 | ″ | ″ | C₂H₅(HN)—⌬—SO₂C₂H₄OSO₃H | ″ |
| 10 | ″ | ″ | C₂H₅(HN)—⌬—SO₂C₂H₄OSO₃H | ″ |

TABLE I-continued

| Example No. | Aniline compound (III) | Intermediate dioxazine compound (V) | Amine (VI) | Color on cotton |
|---|---|---|---|---|
| 11 | [H₂N-C₆H₃(NH₂)(SO₃H)] | dioxazine with SO₃H, NH₂, Cl, Cl substituents | [H₂N-C₆H₃(SO₃H)-SO₂CH₂CH₂OSO₃H] | Reddish blue |
| 12 | " | " | [H₂N-C₆H₄-SO₂CH=CH₂] | " |
| 13 | " | " | [H₂N-C₆H₄-SO₂C₂H₄OCOCH₃] | " |
| 14 | " | " | [H₂N-C₆H₄-SO₂C₂H₄OPO₃H₂] | " |
| 15 | [H₂N-C₆H₃(NH₂)(SO₃H)] | dioxazine | [H₂N-naphthyl(SO₃H)-SO₂CH=CH₂] | Reddish blue |
| 16 | [diphenylamine with SO₃H, NH₂, NH₂] | dioxazine with additional HO₃S, H₂N, NH groups | [H₂N-C₆H₄-SO₂C₂H₄OSO₃H] | " |
| 17 | [H₂N-C₆H₃(NHC₂H₄NH₂)(SO₃H)] | dioxazine with NHC₂H₄NH₂, SO₃H groups | [H₂N-naphthyl(SO₃H)-SO₂C₂H₄OSO₃H] | Blue |
| 18 | [H₂N-C₆H₃(NHC₂H₄—NH₂)(SO₃H)] | dioxazine with NHC₂H₄—NH₂, SO₃H groups | [H₂N-C₆H₄-SO₂C₂H₄OSO₃H] | " |

TABLE I-continued

| Example No. | Aniline compound (III) | Intermediate dioxazine compound (V) | Amine (VI) | Color on cotton |
|---|---|---|---|---|
| 19 | H₂N–C₆H₃(SO₃H)–NHC₃H₆–NH₂ | dioxazine with H₂NH₆C₃HN– and –NHC₃H₆–NH₂, SO₃H groups | 4-(C₂H₅)HN–C₆H₄–SO₂C₂H₄OSO₃H | Blue |
| 20 | " | " | H₂N–C₆H₄–SO₂C₂H₄OSO₃H (meta) | " |
| 21 | H₂N–C₆H₃(SO₃H)–NH–C₆H₃(SO₃H)–NH₂ | dioxazine with HO₃S, H₂N substituted anilino groups, SO₃H | H₂N–naphthyl–SO₂C₂H₄OSO₃H (with HO₃S–) | Reddish blue |
| 22 | " | " | H₂N–C₆H₄–SO₂C₂H₄OSO₃H | " |

Example 23

Example 1 was repeated, provided that the metanilic acid used in Example 1 was replaced by orthanilic acid, sulfanilic acid, 1-aminonaphthalene-3,6-disulfonic acid, 1-aminonaphthalene-4,6,8-trisulfonic acid, 2-aminonaphthalene-4,8-disulfonic acid, 2-aminonaphthalene-3,6,8-trisulfonic acid, aniline-2,5-disulfonic acid, aniline, m-toluidine, o-anisidine, ammonia, ethylamine, ethanolamine, β-alanine, taurine and N-methyltaurine, respectively, thereby obtaining the corresponding dioxazine compound.

Example 24

Each of Examples 2 to 22 was repeated, provided that the metanilic acid was replaced by respective amine used in Example 23, thereby obtaining the corresponding dioxazine compound.

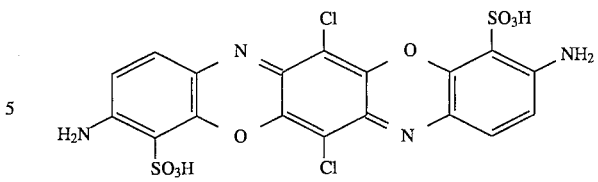

which had been obtained in the same manner as in Example 1, was added to the above reaction mixture, and the resulting mixture was allowed to react each other, while sodium carbonate being added to perform neutralization. After completion of the reaction, 1-aminobenzene-3-β-sulfatoethylsulfone (56 parts) were added thereto, and the mixture was heated to 50° to 90° C., while sodium carbonate being added to neutralize the hydrochloric acid liberated. Completion of the reaction gave a dioxazine compound represented by the following formula in the free acid form.

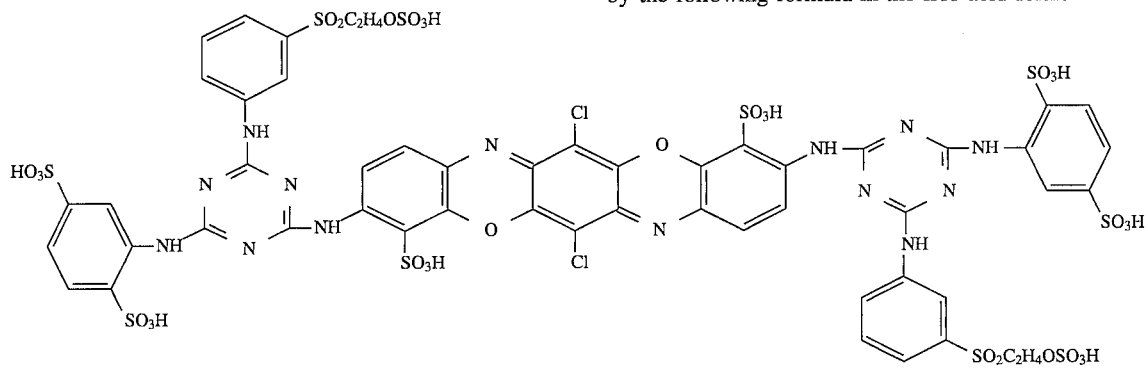

λmax 590 nm in a water medium

This compound was found to be the same as obtained in Example 23 with use of aniline-2,5-disulfonic acid.

Example 25

Each dioxazine compound obtained in Examples 3 to 24 (each of 0.1, 0.3 and 0.6 parts) was dissolved respectively in water (200 parts) to prepare each dye bath. Sodium sulfate (10 parts) and cotton (10 parts) were added thereto. The bath was heated to 60° C., and then sodium carbonate (4 parts) was added thereto. Dyeing was continued for 1 hour at that temperature. Thereafter, the cotton taken out was washed with water, soaped, again washed with water and then dried to obtain each dyed product of a blue color superior in fastness properties. The build-up property was found to be superior.

Example 26

Example 1 was repeated, provided that metanilic acid and 1-aminobenzene-3-β-sulfatoethylsulfone to be subjected to condensation reaction were exchanged in the reaction order, thereby obtaining the same dioxazine compound as in Example 1.

Example 27

Aniline-2,5-disulfonic acid (51 parts) was dissolved in water (500 parts), while sodium carbonate being added to perform neutralization. To this solution was added cyanuric chloride (37 parts) at 5° to 30° C., and the mixture was stirred at that temperature to complete the reaction. The dioxazine intermediate compound of the following formula (54 parts),

Examples 28 to 43

Using the compound represented by the formula (III) as shown in the following Table II in place of the 1,4-diaminobenzene-2-sulfonic acid used in Example 1, a manner similar to that of Example 1 was repeated to obtain the corresponding intermediate dioxazine compound represented by the formula (V) as shown in the following Table II.

The intermediate dioxazine compound was subjected to condensation reactions in a manner similar to that of Example 1 or 26 using the compounds represented by the formulas (VI) and (VII) as shown in the following Table II in place of 1-aminobenzene-3-β-sulfatoethylsulfone and metrnilic acid used in Example 1, respectively, or in a manner similar to that of Example 27 using those mentioned above in place of 1-aminobenzene-3-β-sulfatoethylsulfone and aniline-2,5-disulfonic acid used in Example 27, respectively, thereby obtaining the corresponding dioxazine compound.

TABLE II

| Example No. | Aniline compound (III) | Intermediate dioxazine compound (V) | Compound (VII) | Amine compound (VI) | Color on cotton |
|---|---|---|---|---|---|
| 28 | H₂N—C₆H₃(NH₂)(SO₃H) | dioxazine intermediate with H₂N-aryl-SO₃H groups, Cl, O, N substituents | morpholine (H-N(C₂H₄)₂O) | H₂N-C₆H₄-SO₂C₂H₄OSO₃H (meta) | Reddish blue |
| 29 | " | " | " | H₂N-C₆H₄-SO₂C₂H₄-OSO₃H | " |
| 30 | " | " | HN(C₂H₄OH)₂ | C₂H₅-HN-C₆H₄-SO₂C₂H₄-OSO₃H | " |
| 31 | " | " | H₂N-C₆H₃(SO₃H)₂ | OCH₃-C₆H₃(NH₂)-SO₂C₂H₄-OSO₃H | " |
| 32 | H₂N-C₆H₃(SO₃H)-NH-C₆H₃(SO₃H)-NH₂ | extended dioxazine intermediate | H₂N-C₆H₃(SO₃H)₂ | H₂N-C₆H₄-SO₂C₂H₄O-SO₃H | Reddish blue |
| 33 | " | " | HN(C₂H₅)₂ | C₂H₅-HN-C₆H₄-SO₂C₂H₄-OSO₃H | " |
| 34 | " | " | H₂N-naphthyl-(SO₃H)₂ | H₂N-C₆H₂(OCH₃)₂-SO₂C₂H₄-OSO₃H | " |
| 35 | " | " | C₂H₅-HN-C₆H₅ | H₂N-C₆H₃(SO₃H)-SO₂C₂H₄-OSO₃H | " |

TABLE II-continued

| Example No. | Aniline compound (III) | Intermediate dioxazine compound (V) | Compound (VII) | Amine compound (VI) | Color on cotton |
|---|---|---|---|---|---|
| 36 | H₂N–C₆H₃(NHC₂H₄NH₂)(SO₃H) | dioxazine with H₂NH₄C₂HN and NHC₂H₄NH₂, SO₃H, Cl substituents | morpholine (O–N–H) | C₂H₅–HN–C₆H₄–SO₂C₂H₄OSO₃H | Reddish blue |
| 37 | " | " | HN(CH₂OH)₂ | H₂N–naphthyl–SO₂C₂H₄OSO₃H | " |
| 38 | " | " | H₂N–C₆H₃(SO₃H)₂ | " | " |
| 39 | " | " | H₂NCH₂COOH | H₂N–C₆H₄–SO₂CH=CH₂ | " |
| 40 | H₂N–C₆H₃(NHC₃H₆NH₂)(SO₃H) | dioxazine with H₂NH₆C₃HN and NHC₃H₆NH₂, SO₃H, Cl substituents | H₂NC₂H₄OCH₃ | H₂N–C₆H₃(Cl)–SO₂C₂H₄–OSO₃H | Blue |
| 41 | " | " | H₂N–C₆H₄–SO₃H | H₂N–C₆H₃(SO₃H)–SO₂C₂H₄–OSO₃H | " |
| 42 | " | " | H₂N–C₆H₃(SO₃H)₂ | H₂N–C₆H₄–SO₂C₂H₄–OSO₃H | " |
| 43 | " | " | H₂N–C₆H₃(COOH)(SO₃H) | " | " |

Example 44

Each dioxazine compound obtained in Examples 27 to 43 (each of 0.1, 0.3 and 0.6 parts) was dissolved in water (200 parts), and sodium sulfate (10 parts) and cotton (10 parts) were added thereto. The bath was heated to 60° C. and then sodium carbonate (4 parts) was added thereto. Thereafter, dyeing was continued for 1 hour at that temperature. The cotton taken out was washed with water, soaped, again washed with water and then dried to obtain each dyed product of a blue color superior in fastness properties. Each dioxazine compound was found to be superior in build-up property.

Example 45

2-Methoxy-4,6-dichloro-s-triazine (36 parts) and the same intermediate dioxazine compound (54.5 parts) as in Example 1 were subjected to condensation reaction with each other in a manner similar to that of Example 27, followed by condensation reaction with 1-aminobenzene-3-β-sulfatoethylsulfone (56 parts), and thereafter salting-out gave a dioxazine compound represented by the following formula in the free acid form.

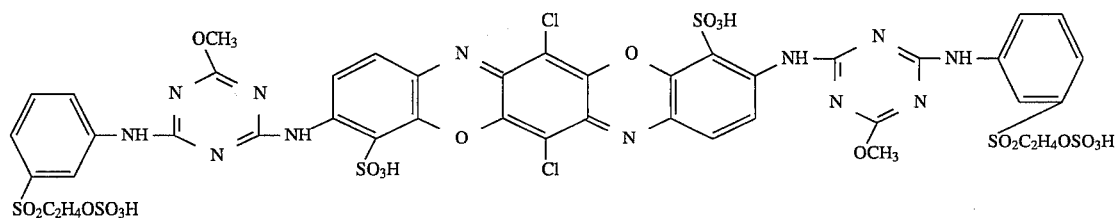

Examples 46 to 57

Example 45 was repeated, provided that the intermediate dioxazine compound, 2-methoxy-4,6-dichloro-s-triazine and 1-aminobenzene-3-β-sulfatoethylsulfone used in Example 45 were replaced by those represented by the formula (V), 2-alkoxy-4,6-dichloro-s-triazines and those represented by the formula (VI), respectively, as shown in the following Table III in which the alkoxy only is shown for the 2-alkoxy-4,6-dichloro-s-triazine used, thereby obtaining the corresponding dioxazine compound.

TABLE III

| Example No. | Intermediate dioxazine compound (V) | 2-Alkoxy-4,6-dichloro-s-triazine | Amine compound (VI) | Color on cotton |
|---|---|---|---|---|
| 46 | dioxazine with NH₂, SO₃H, Cl, O, N groups and H₂N-C₆H₃(SO₃H) substituent | —OCH₃ | H₂N-naphthalene(SO₃H)-SO₂C₂H₄OSO₃H | Reddish blue |
| 47 | " | " | H₂N-C₆H₃(OCH₃)-SO₂CH=CH₂ | " |
| 48 | " | " | H₂N-naphthalene-SO₂C₂H₄OSO₃H | " |
| 49 | " | —OC₂H₅ | H₂N-C₆H₃(SO₃H)-SO₂C₂H₄OSO₃H | " |
| 50 | dioxazine variant | —OCH₃ | C₂H₅(HN)-C₆H₄-SO₂C₂H₄OSO₃H | Reddish blue |
| 51 | " | " | C₂H₅(HN)-C₆H₄-SO₂C₂H₄OSO₃H | " |
| 52 | dioxazine with NH₂, NH, SO₃H groups | " | H₂N-C₆H₄-SO₂C₂H₄OSO₃H | " |
| 53 | dioxazine with NHC₂H₄NH₂ groups | | H₂N-C₆H₄-SO₂C₂H₄OSO₃H | Blue |

TABLE III-continued

| Example No. | Intermediate dioxazine compound (V) | 2-Alkoxy-4,6-dichloro-s-triazine | Amine compound (VI) | Color on cotton |
|---|---|---|---|---|
| 54 | [structure with H$_2$NH$_4$C$_2$HN, Cl, SO$_3$H, O, N, NHC$_2$H$_4$NH$_2$, SO$_3$H] | —OCH$_3$ | [naphthalene with H$_2$N, SO$_3$H, SO$_2$C$_2$H$_4$OSO$_3$H] | Blue |
| 55 | | " | [benzene with H$_2$N, SO$_3$H, SO$_2$C$_2$H$_4$OSO$_3$H] | " |
| 56 | " | " | [benzene with H$_2$N, OCH$_3$, SO$_2$C$_2$H$_4$OSO$_3$H] | " |
| 57 | [structure with H$_2$NH$_6$C$_3$NH, Cl, SO$_3$H, O, N, NHC$_3$H$_6$NH$_2$, SO$_3$H] | " | [benzene with H$_2$N, Br, SO$_2$C$_2$H$_4$OSO$_3$H] | " |

Example 58

Each dioxazine compound obtained in Examples 45 to 57 (each of 0.1, 0.3 and 0.6 parts) was dissolved in water (200 parts), and sodium sulfate (10 parts) and cotton (10 parts) were added thereto. The bath was heated to 60° C. and then sodium carbonate (4 parts) was added thereto. Thereafter, dyeing was continued for 1 hour at that temperature. The cotton taken out was washed with water, soaped, again washed with water and then dried to obtain each dyed product of a blue color superior in fastness properties. Each dioxazine compound was found to be superior in build-up property.

Example 59

Composition of color paste

| | |
|---|---|
| Dioxazine compound obtained in Example 1 | 5 parts |
| Urea | 5 parts |
| Sodium alginate (5%) stock paste | 50 parts |
| Hot water | 25 parts |
| Sodium hydrogencarbonate | 2 parts |
| Balance (water) | 13 parts |

Mercerized cotton broad cloth was printed with the color paste having the above composition, pre-dried and steamed at 100° C. for 5 minutes. The treated cloth was washed with hot water, soaped, again washed with hot water and then dried. Thus, there was obtained a printed product of a blue color excellent in fastness properties.

We claim:

1. A dioxazine compound represented by the following formula in the free acid form,

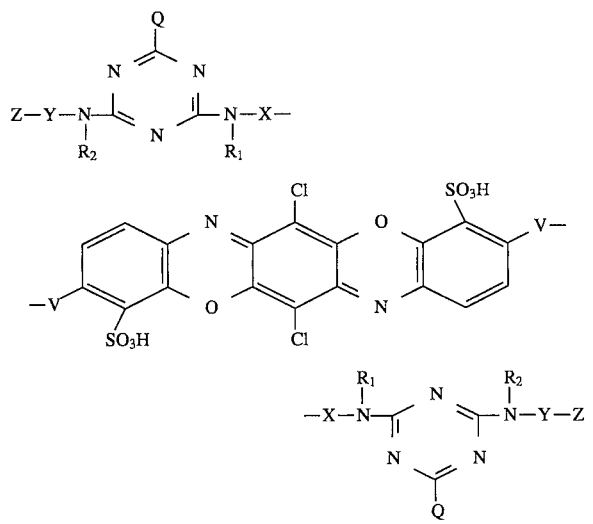

wherein

V—X is a direct linkage, —NHC$_2$H$_4$—, —NHC$_3$H$_6$— or —NH-phenylene unsubstituted or substituted once or twice by sulfo, Y is phenylene unsubstituted or substituted once or twice by methyl, ethyl, methoxy, ethoxy, chloro, bromo, sulfo or carboxy, or naphthylene unsubstituted or substituted once by sulfo, Z is —SO$_2$CH=CH$_2$ or —SO$_2$CH$_2$CH$_2$Z$_1$ in which Z$_1$ is a group capable of being split by the action of an alkali, Q is amino, carboxymethylamino, N,N-dihydroxymethylamino, ethylamino, β-carboxyethylamino, β-hydroxyethylamino, β-methoxyethylamino, β-sulfoethylamino, N-(β-sulfoethyl)-N-methylamino, N,N-diethylamino, N,N-di-β-hydroxyethyl-amino, phenylamino, N-ethyl-N-phenylamino, toluidino, anisidino, 2-, 3- or 4-sulfoanilino, 2,4- or 2,5-disulfoanilino, 2-carboxy-5-sulfophenylamino, 3,6-disulfonaphthyl-(1)-amino, 3,6,8-trisulfonaphthyl-(1)-amino, 4,8-disulfonaphthyl-(2)-amino, 3,6,8-trisulfonaphthyl-(2)-amino or morpholino, and R$_1$ and R$_2$ independently of one another are each hydrogen or alkyl of 1 to 4 carbon atoms.

2. The dioxazine compound according to claim 1 wherein V and X are each direct linkage, or V is —NH— and X is ethylene, propylene or sulfophenylene, Y is phenylene unsubstituted or substituted by methyl, methoxy or sulfo, Z is —SO$_2$CH=CH$_2$ or —SO$_2$CH$_2$CH$_2$OSO$_3$H, and R$_2$ is hydrogen, methyl or ethyl.

3. The dioxazine compound according to claim 1, wherein Z is —SO$_2$CH=CH$_2$ or —SO$_2$CH$_2$CH$_2$OSO$_3$H.

4. The dioxazine compound according to claim 1, wherein Q is β-sulfoethylamino, phenylamino, N-ethyl-N-phenylamino, 2-, 3- or 4-sulfoanilino, 2,4- or 2,5-disulfoanilino.

5. The dioxazine compound according to claim 1, wherein R$_1$ and R$_2$ independently of one another are each hydrogen, methyl or ethyl.

6. The dioxazine compound according to claim 1, wherein V is —NH—, X is ethylene or propylene, Y is phenylene unsubstituted or substituted by methyl, methoxy or sulfo, Z is —SO$_2$CH=CH$_2$ or —SO$_2$CH$_2$CH$_2$OSO$_3$H, R$_1$ and R$_2$ are each hydrogen and Q is 2,4- or 2,5-disulfoanilino or 2-carboxy-5-sulfophenylamino.

7. A dioxazine compound of the following formula in the free acid form,

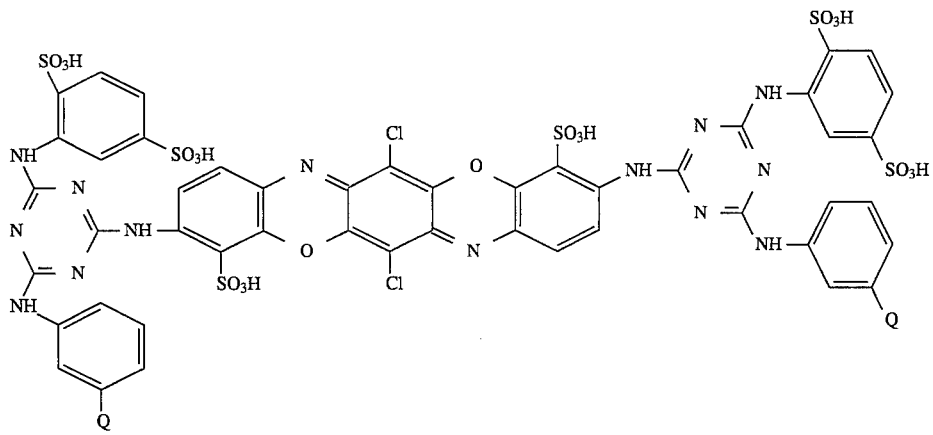
wherein Q is —SO$_2$CH$_2$CH$_2$OSO$_3$H.
8. A dioxazine compound of the following formula in the free acid form,
10. A dioxazine compound of the following formula in the free acid form,
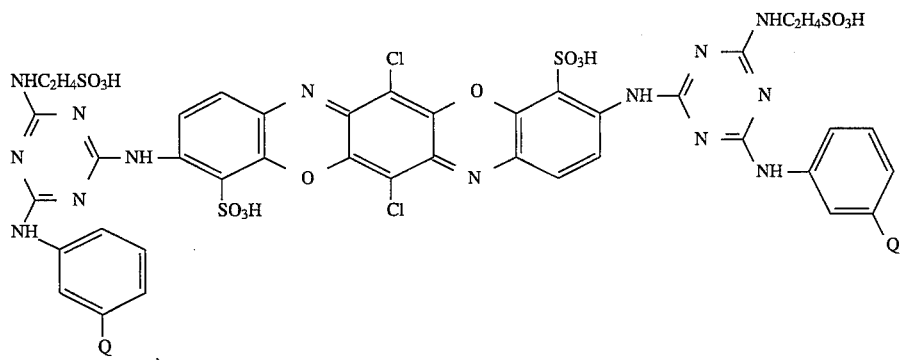
wherein Q is —SO$_2$CH$_2$CH$_2$OSO$_3$H.
9. A dioxazine compound of the following formula in the free acid form,
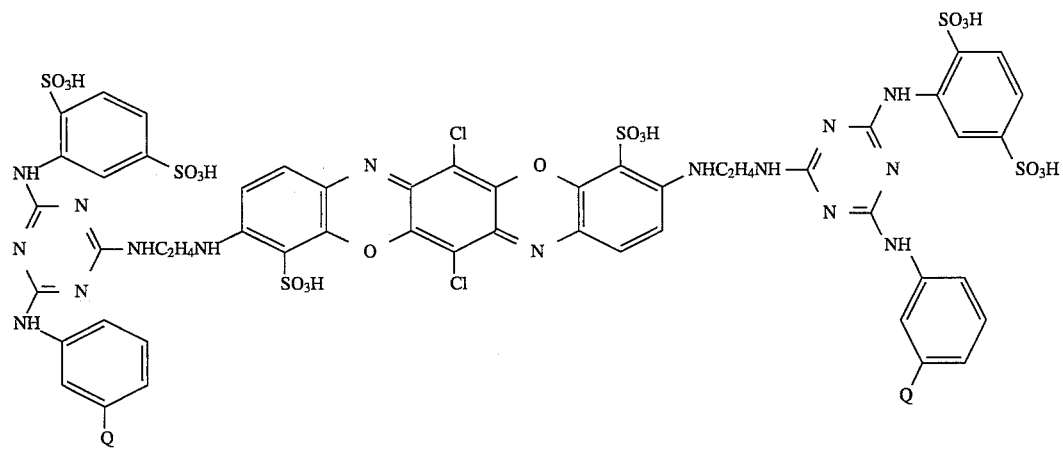
wherein Q is —SO$_2$CH$_2$CH$_2$OSO$_3$H.

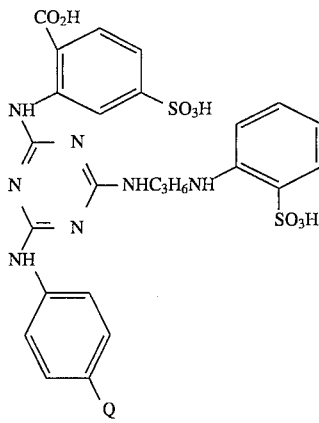
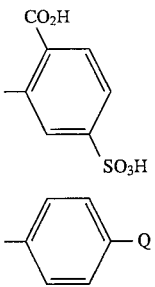
wherein Q is —SO$_2$CH$_2$CH$_2$OSO$_3$H.
11. A dioxazine compound of the followig formula in the free acid form,
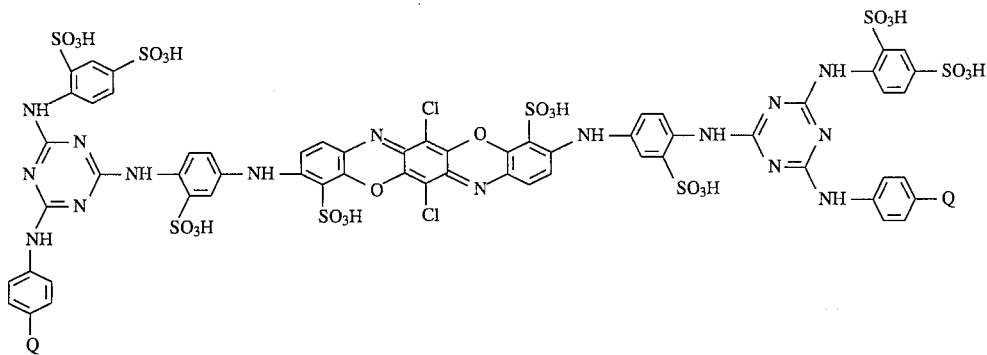
wherein Q is —SO$_2$CH$_2$CH$_2$OSO$_3$H.
* * * * *